3,817,805
METHOD OF JOINTING PIPES WITH INTERNAL HEAT-SENSITIVE COATING AND JOINT BASED ON SAID METHOD

Leonid Stepanovich Surikov, ulitsa Krupskoi 8, korpus 1, kv. 173, Moscow, U.S.S.R.; Alexei Pavlovich Kokonin, ulitsa Schorsa 2, kv. 18, Bykovo Moskovskoi oblasti, U.S.S.R.; and Georgy Nikolaevich Klebanov, ulitsa Krasikova 7/43, korpus 3, kv. 91; Jury Mikhailovich Isaenko, Anadyrsky proezd 13, kv. 14; Ivan Yakovlevich Degtyarev, Kutuzovsky prospekt 24, kv. 58; and Tatiana Leonidovna Roslyakova, ulitsa Krupskoi 8, korpus 1, kv. 173, all of Moscow, U.S.S.R.
Filed Nov. 26, 1971, Ser. No. 202,508
Int. Cl. B65h 69/02
U.S. Cl. 156—158     1 Claim

ABSTRACT OF THE DISCLOSURE

Pipes with internal heat-sensitive coating are jointed by welding their connecting elements and leaving an air space between the welded seam and the external surface of the pipes being jointed.

---

The present invention relates to the methods of jointing metal pipes whose internal surface has a heat-sensitive coating and to the joints based on said methods.

The heat-sensitive coatings may consist of conducting metals (copper, aluminium, tin, etc.) as well as varnishes, resins, paints and plastics which serve dielectric, anti-corrosion and other purposes.

In particular, the method of jointing pipes according to the present invention can be used in communications service for the assembly of waveguide pipes subsequently connected into waveguide lengths and lines.

The known methods of jointing waveguide pipes used in the construction of waveguide lines utilize exclusively mechanical joints (screw joint, press joints, etc.) which involve no heating of the pipes being jointed because said pipes are provided with vulnerable internal heat-sensitive coatings.

The disadvantages of the known methods of jointing waveguide pipes are low and unstable strength of the joint compared with the strength of the base material, insufficient reliability of the joints with respect to their tightness caused by ageing of the seals, difficulties in the use of mechanization and automation in the course of assembly and construction of the waveguide lines as well as a high cost of the jointing elements and their assembly (a high proportion of manual labour).

An object of the present invention is to provide such a method of jointing pipes with heat-sensitive internal coatings and such a joint of these pipes which would improve the reliability of the waveguides.

Another object of the invention is to provide such a method of jointing pipes with heat-sensitive internal coatings and such a joint of these pipes which would reduce the cost of the waveguide lines.

These and other objects of the invention are accomplished by providing a method of jointing pipes wherein connecting elements are fastened to the pipe ends being jointed and the pipes are covered inside with a heat-sensitive coating before jointing. According to the invention, the intermediate connecting elements are welded to one another for jointing the pipes, leaving an air space under the welded seam, said air space separating the welded spot from the pipe bodies to protect the heat-sensitive coating against heating and deterioration.

The above disclosed method can be realized by a pipe joint consisting of a welded sleeve connecting the pipe ends from outside and made up of circular flanges welded to the pipe ends and an intermediate ring welded to each flange, said flanges and adjoining portions of the ring being provided inside with radial circular grooves which form an air chamber between the external welds and the pipe surface.

Thus, the present invention relates to the method of jointing pipes with a heat-sensitive internal coating which produces joints improving the reliability of the waveguide, reducing the scope of manual work and the cost of waveguide pipe jointing, and creating conditions for the automation of the pipe jointing process.

Now the invention will be described in detail by way of example with reference to the drawings, in which.

Figure 1:
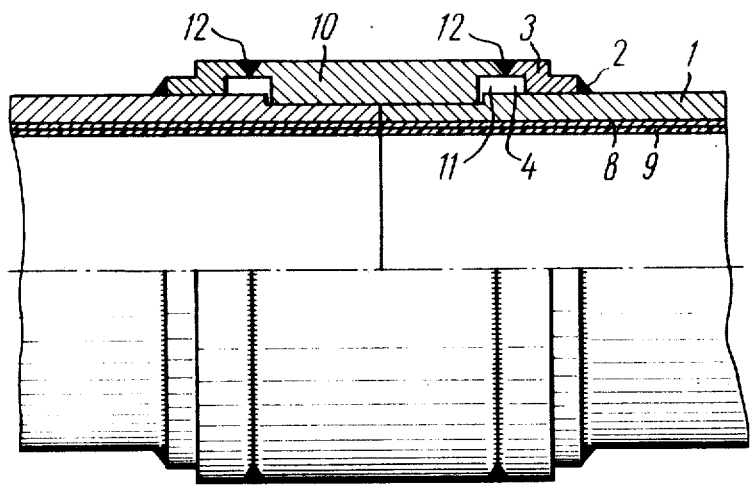
FIG. 1 illustrates a joint of the waveguide pipes according to the invention.

Given below is a description of the method of jointing pipes with heat-sensitive internal coatings according to the invention by way of an example rotated to jointing the waveguide pipes; FIG. 1 illustrates the claimed pipe joint for the realization of said method.

Figure 2:
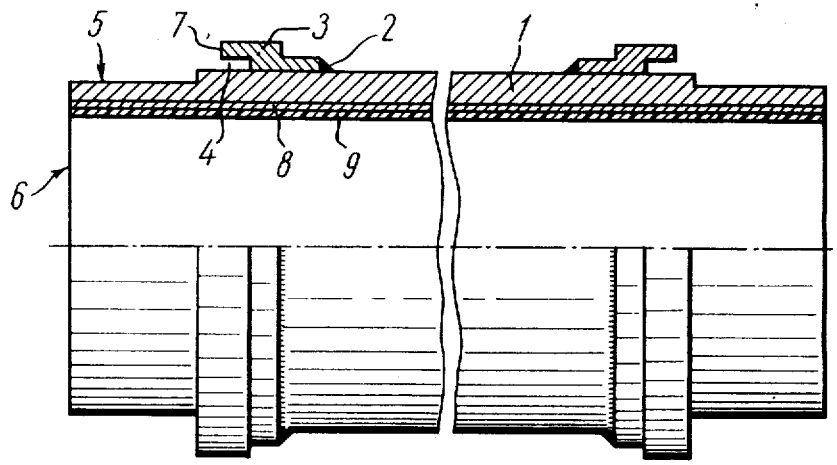
FIG. 2 illustrates a waveguide pipe with circular flanges welded to its ends.

Using an automatic rotary welder (not shown in the drawing) circular flanges (buffer rings) 3 with radial circular grooves 4 inside are welded by a circular seam 2 to the ends of the waveguide pipe 1 (FIG. 2) delivered from the rolling mill.

Then the mounting necks 5 of the waveguide pipe are turned on a lathe. The butt end 6 of the pipe, neck 5 and the butt end 7 of the buffer ring 3 are machined at one setting.

Now the internal surface of the waveguide pipe is treated with a heat-sensitive coating—a conducting copper layer 8 and a dielectric varnish coating 9.

Then a finally machined intermediate ring (aligning sleeve) 10 provided, like the buffer rings 3, with internal circular grooves 11 is driven on the machined necks of the waveguide pipes being jointed; this is done in a welding machine (not shown in the drawings).

Then, using a welding head (not shown in the drawings) which ensures automatic welding of nonrotatable joints, the aligning sleeve 10 is welded to the buffer rings by two seams 12.

The butt ends of the buffer rings 3 with grooves 4 welded with the butt ends of the aligning sleeve with grooves 11, form air chambers between the external seams 12 and the surface of the pipes 1 being jointed.

Owing to these air chambers located under the welded seams 12 the heat produced by welding does not affect the heat-sensitive coating 8, 9 of the jointed pipes.

Figure 3:
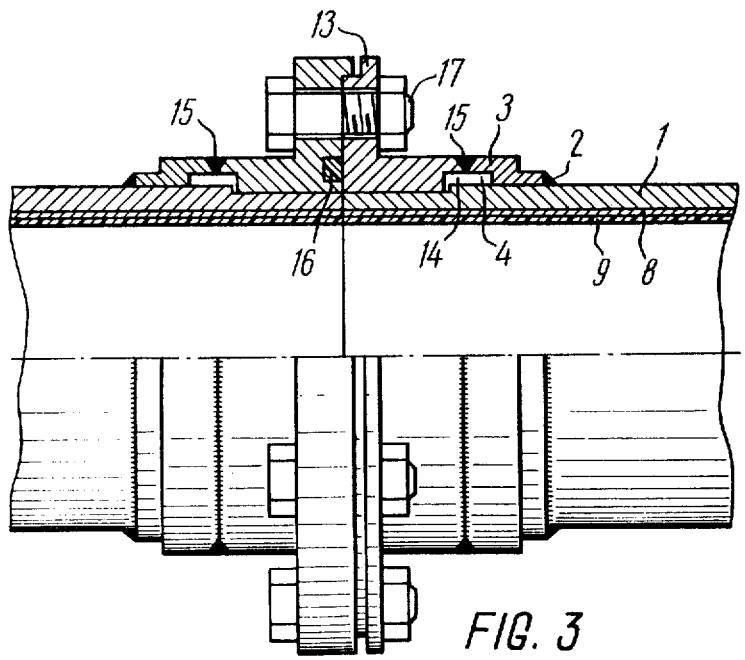
FIG. 3 illustrates a flange joint for connecting lengths of waveguide pipes into a waveguide line.

The waveguide lengths made up in this manner of several waveguide pipes are connected to each other in the course of laying the waveguide lines by the flange joint illustrated in FIG. 3.

Unlike the practice followed in connecting individual waveguide pipes, instead of driving-on the sleeve 10, each end of the pipe lengths is fitted with a pressed-on flange 13 which, similarly to the buffer ring 3 and aligning sleeve 10, has an internal circular groove 14.

Then, using a welding head which ensures automatic welding of nonrotatable joints, the flanges 13 are welded to the buffer ring 3 by assembly seams 15. In this case, like it is done in welding individual waveguide pipes, air spaces are created under the assembly seams, above the surface of the pipes being jointed.

Pressure tightness of the joints connecting the waveguide lengths is ensured by a rubber sealing ring 16 placed between the flanges.

The waveguide lengths are then finally jointed with the aid of bolts 17.

Industrial tests of the welded sleeve according to the invention have yielded positive results, namely: the copper and varnish coatings inside the pipe remain intact; no leaks have been discovered by the tightness tests; the joint according to the invention ensures the requisite accuracy of assembly; the manufacture of connecting elements and the welding of the pipes with the rings is simple and does not involve the use of any special equipment.

What is claimed is:

1. A method of jointing pipes comprising the following operations: welding intermediate connecting elements to the pipe ends being jointed; application of a heat-sensitive coating to the inside surface of the pipes; and welding together the connecting elements for jointing the pipes, with an air space left under the welded seam, said air space separating the welded spot from the pipe bodies in order to protect the heat-sensitive coating.

References Cited

UNITED STATES PATENTS 3,202,562  8/1965  Lang et al. _____ 156—304 X

WILLIAM A. POWELL, Primary Examiner

U.S. Cl. X.R.

138—155; 156—91, 304